Jan. 19, 1932.  R. F. BACON  1,842,230
RECOVERY OF SULPHUR FROM ROASTER GASES
Filed May 9, 1927
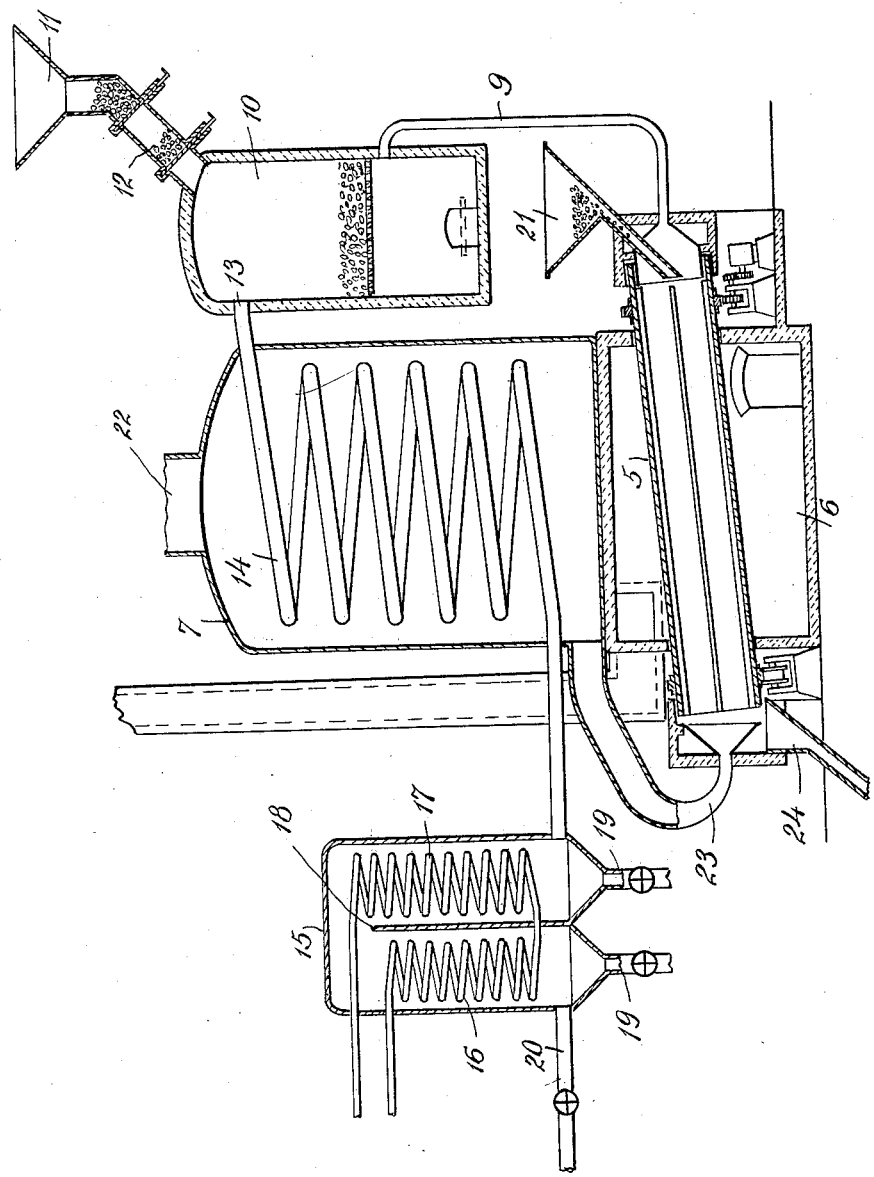
INVENTOR
Raymond F. Bacon
BY
Pennie, Davis, Marvin, Edmonds
ATTORNEY Patented Jan. 19, 1932

1,842,230

UNITED STATES PATENT OFFICE

RAYMOND F. BACON, OF BRONXVILLE, NEW YORK

RECOVERY OF SULPHUR FROM ROASTER GASES

Application filed May 9, 1927. Serial No. 189,842.

This invention relates to the recovery of sulphur from roaster gases, and has for its object the provision of an improved method of recovering sulphur in elemental form from roaster gases. More particularly, the invention aims to provide an improved method of recovering elemental sulphur from roaster gases by preheating the air entering the roasting chamber and thus enriching the roaster gases in sulphur dioxide.

Sulphur dioxide may be reduced to elemental sulphur by suitable high temperature treatment with reducing agents, such as carbonaceous fuels, in the nature of coke or coal, liquids in the nature of petroleum, or gases in the nature of natural gas, producer gas, or water gas. When it is desired to carry out this reaction, making use of roaster gases as the source of sulphur dioxide, the dilute nature of the roaster gases and the consequent low content of sulphur dioxide tend to make the commercial practice impracticable. This is due directly from two causes; one is the immense volume of gases which must be heated to a high temperature; the other is the difficulty of separating a comparatively small amount of solid sulphur from such a large volume of gas.

I have discovered that the gases given off from the roasting of such materials, as ores in the nature of iron pyrites or other sulphide minerals or compounds, may be enriched in sulphur dioxide by preheating the air entering the furnace. This enrichment may be carried to such an extent that the subsequent reduction of elemental sulphur and the recovery of the reduced sulphur is entirely practicable. The preheating of the air I accomplish by making use of the excess heat carried by the gases leaving the reducing chamber.

I have found that it is not sufficient to furnish an intimate mixture of the air entering the roasting retort and the sulphur-bearing compounds within the retort. It is advantageous to construct the roasting retort in such a manner that, during the rotating of the retort, the sulphur-bearng material is carried up the side of the retort and showered through the reacting air. I have found when roasting sulphur-bearing materials in this manner that in order to maintain the combustion with sulphur at a sufficient rate to maintain the necessary heat to properly support combustion, it is necessary to supply the oxygen at a fairly rapid rate and the consequence is that there is not time or contact enough to allow for the burning out of the oxygen in the air.

In practicing the present invention, the air may be moved through the roasting chamber at a comparatively slow rate, provided that the entering air is heated to a sufficiently high temperature so that the reaction commences immediately upon its entrance into the retort, and provided also that the revolving retort is provided with longitudinal baffle plates which will carry the finely divided sulphur material up the side of the retort and shower it down through the heated air.

The preheating of the air entering the roasting retort may be carried out in any desired manner. The excess heat carried by the vapors leaving the reducing chamber may be utilized by suitable heat interchange apparatus, or it may be found advantageous to make use of the exhaust gases given off by the furnace which externally heats the roasting retort. Or a combination of these two methods may be used. It is essential that the air entering the roasting retort carry sufficient heat units to permit the oxidation reaction to commence immediately upon the entrance of the air into the roasting retort. In practicing the invention in this manner, the gases leaving the upper or charging end of the retort are substantially saturated with sulphur dioxide, and carry a minimum of unreacted oxygen.

Various forms of apparatus are available for the practice of the invention. In the single figure of the accompanying drawing, I have illustrated an apparatus satisfactory for the purpose.

The apparatus illustrated in the drawing comprises a rotating, inclined, cylindrical retort 5 of any appropriate material, adapted to withstand corrosive influences encountered in roasting sulphur-bearing compounds to obtain sulphur dioxide. The retort may be enclosed for the greater part of its length in an appropriate furnace structure 6. The lower or discharging end of the retort is operatively connected to a heat interchange apparatus 7 so that the air entering the roasting retort is preheated to a desired degree. The upper or charging end of the retort is operatively connected to the reduction furnace or chamber 10 by the pipe 9.

The reduction chamber is supplied with reducing material in any appropriate manner. Coal or coke may be provided for this purpose from the hopper 11 through the valved pipe 12. The reduced gases are withdrawn from the reducing chamber 10 through the opening 13, which is operatively connected with the heat interchange apparatus 7 and with the condenser 15 by the pipe 14.

The condenser 15 is provided with cooling coils 16 and 17, and is divided into two portions by a baffle wall 18. Suitable valved sulphur withdrawing passages 19 are provided in the condenser compartment bottoms and a gas exit passage 20 releases the spent gases from the processes.

The operation of the apparatus will be understood from the foregoing description. Sulphur-bearing material in the nature of pyrites is fed into the retort 5 through the hopper 21. Air to support combustion is admitted through the opening 22 and is heated in its passage through the heat interchanger 7. A heated air is forced into the roasting retort through the passage 23. The spent cinder or ash is withdrawn from the lower end of the retort 5 through the spout 24. During the operation of the retort external heat may be applied to the retort by means of the furnace 6. The roaster gases issuing from the upper or charging end of the retort pass through the pipe 9 into the reduction furnace or chamber 10, where they react with the heated reducing material and are withdrawn from the chamber through the passage 13, and the pipe 14 passing through the heat interchanger 7. In the heat interchanger they give up part of their heat to the air entering the process. The gases then pass to the condenser 15 where the cooling coils 16 and 17 chill the vapors and condense the sulphur into elemental sulphur, which falls to the bottom of the compartments and is withdrawn through the valved openings 19. The spent gases pass from the apparatus through the passage 20.

While certain forms of apparatus have been illustrated, it is understood that these may be varied or changed at will without in any way departing from the spirit of the invention. The use of a liquid or gaseous reducing agent in place of the solid carbonaceous fuel will necessitate a different type of reduction chamber. It may be desirable to use the waste gases from the heating furnace in a heat interchanger apparatus to preheat the incoming air. This apparatus, although not illustrated, would not depart from the spirit of the invention. The type of condenser may be changed to suit any operating condition that may be met. The oxidizing retort may be altered to better handle any given type of sulphur-bearing material. In place of a tubular retort which showers the pyrites through the gaseous stream, a retort with mechanical arms to keep the pyrites stirred up in contact with the gaseous stream may be used.

I claim:

1. The method of recovering sulphur from roaster gas which comprises oxidizing sulphur compounds thereby forming sulphur dioxide, reducing the said sulphur dioxide and using the heat of reduction to aid the oxidation of the said sulphur compounds.

2. The method of recovering sulphur from roaster gas which comprises preheating air, oxidizing sulphur compounds with the said preheated air thereby producing a roaster gas rich in sulphur dioxide, reducing the said sulphur dioxide of the roaster gas and utilizing the heat of reduction to preheat the air and aid the oxidation of the said sulphur compounds.

3. The method of recovering sulphur from roaster gas which comprises preheating air, oxidizing sulphur compounds with the said preheated air thereby producing a roaster gas rich in sulphur dioxide, reducing the said sulphur dioxide of the roaster gas and utilizing the gases produced during the reduction to preheat the air and aid the oxidation of the said sulphur compounds.

In testimony whereof I affix my signature.

RAYMOND F. BACON.